United States Patent [19]
Gono et al.

[11] Patent Number: 5,553,588
[45] Date of Patent: Sep. 10, 1996

[54] SPARK-IGNITED DIRECT CYLINDER FUEL INJECTION ENGINE

[75] Inventors: Takeshi Gono, Shizuoka; Souichi Matsushita, Susono, both of Japan

[73] Assignee: Toyota Jidosha Kabushiki Kaisha, Toyota, Japan

[21] Appl. No.: 503,443

[22] Filed: Jul. 17, 1995

[30] Foreign Application Priority Data

Jul. 27, 1994 [JP] Japan .................... 6-175577

[51] Int. Cl.⁶ ........................................ F02F 3/26
[52] U.S. Cl. ........................................ 123/276
[58] Field of Search ........................ 123/276, 263, 123/302, 260

[56] References Cited

U.S. PATENT DOCUMENTS

| | | | |
|---|---|---|---|
| 1,498,273 | 6/1924 | Hesselman | 123/276 |
| 1,633,541 | 6/1927 | Braren | 123/276 |
| 1,865,841 | 3/1930 | Cummins | 123/276 |
| 1,977,752 | 10/1934 | Baj | 123/276 |
| 2,151,218 | 3/1939 | Lutz | 123/276 |
| 5,109,816 | 5/1992 | Sasaki | 123/263 |
| 5,127,379 | 7/1992 | Kobayashi et al. | 123/302 |
| 5,259,348 | 11/1993 | Kobayashi et al. | 123/276 |
| 5,327,864 | 7/1994 | Reguerio | 123/260 |

FOREIGN PATENT DOCUMENTS

| | | |
|---|---|---|
| 1119758 | 7/1968 | European Pat. Off. . |
| 3903842 | 9/1989 | European Pat. Off. . |
| 579331A | 3/1993 | Japan . |
| 5231155A | 9/1993 | Japan . |

OTHER PUBLICATIONS

Patent Abstracts of Japan, vol. 9, No. 103 (M–377), May 8, 1985 & JP-A-59 226226 (Toyota), Dec. 19, 1984.
Patent Abstracts of Japan, vol. 17, No. 294 (M–1424), Jun. 7, 1993 & JP-A-05 018244 (Toyota), Jan. 26, 1993.

*Primary Examiner*—Raymond A. Nelli
*Attorney, Agent, or Firm*—Kenyon & Kenyon

[57] ABSTRACT

A spark-ignited direct cylinder fuel injection engine is provided with a combustion chamber formed in a depression on the surface of each piston, and a direct cylinder fuel injection valve spraying a fuel mist directly in the combustion chamber. In the wall of the combustion chamber an arc-shaped first wall surface region is located on the upstream side of the combustion chamber with respect to the swirl flow direction of the intake air. Continuous with the first wall surface region, a straight second wall surface region is formed at the downstream side of the first wall surface region. An arc shaped third wall surface region is formed at the downstream side of the second wall surface region. A spark plug is positioned so that it protrudes into the depressed combustion chamber at the region near the second wall surface region when the piston is positioned at its top dead center. Fuel is injected into the first wall surface region part of the combustion chamber, and carried by the intake swirl flow toward the third wall surface region part of the combustion chamber while it is being diffused and vaporized. Therefore, when flowing along the second wall surface near the spark plug, the injected fuel forms an ignitable air-fuel mixture, thus stable ignition, by the spark plug, is obtained regardless of the amount of the fuel injected into the combustion chamber.

4 Claims, 6 Drawing Sheets

SPARK-IGNITED DIRECT CYLINDER FUEL INJECTION ENGINE

BACKGROUND OF THE INVENTION

1. Field of the Invention

The present invention relates to a spark-ignited direct cylinder fuel injection engine which has spark plugs and fuel injection valves spraying a fuel mist directly into each cylinder, and more specifically to a spark-ignited direct cylinder fuel injection engine in which an air-fuel mixture having an ignitable air-fuel ratio is formed in a region near a spark plug in a combustion chamber by direct fuel injection, this mixture being ignited by means of the spark plug and enabling operation with an overall lean gas mixture.

2. Description of the Related Art

An example of this type of spark-ignited direct cylinder fuel injection engine is disclosed, for example, in the Japanese Unexamined Patent Publication (Kokai) No. 5-231155. In the engine disclosed by JPP'155, a combustion chamber is formed in a shape of a round depression in the top surface of a piston, and a depressed spark plug pocket is formed in wall of the combustion chamber. Fuel injected from a direct fuel injection valve into the combustion chamber forms a gas mixture having a combustible air-fuel ratio inside a plug pocket, and is ignited by a spark from a spark plug.

Additionally, in the engine of JPP'155, the fuel injection valve is such that it generates a fuel jet having a high penetrating force with a narrow spray angle, and injects the fuel so that it strikes the combustion chamber wall surface upstream from the spark plug pocket. As a result, part of the injected fuel is atomized by the collision with surface of the wall of the combustion chamber, this atomized fuel flowing toward the spark plug pocket along the surface of the wall of the combustion chamber, and then flowing into the spark plug pocket. When this occurs, part of the fuel receives heat from the high-temperature surface of the wall of the combustion chamber, thereby being vaporized and resulting in the formation of a air-fuel mixture inside the spark plug pocket.

As described above, even if the amount of injected fuel is small in relation to the amount of air which is taken into the combustion chamber, since the fuel is collected at the spark plug pocket, its concentration is higher inside the spark plug pocket than in other parts of the combustion chamber, whereby an air-fuel mixture having a combustible air-fuel ratio is formed. Therefore, the air-fuel mixture in the spark plug pocket can be ignited by means of the spark plug even though the air-fuel ratio of the mixture outside of the spark plug pocket is too lean to be ignited.

The spark-ignited direct cylinder fuel injection engine described in JPP'155 offers the advantage that, during low-load running, stable operation of the engine becomes possible even when the amount of injected fuel is small, because the fuel is collected in proximity to the spark plug, thus forming an air-fuel mixture having an air-fuel ratio of the ignitable range. However, in an engine such as the one disclosed in JPP'155, if the shape of the combustion chamber is established so that the injected fuel is gathered near the spark plug to form an air-fuel mixture having higher concentration of fuel, there are cases in which problems such as a worsening of ignition, smoke generation, and spark plug fouling occur when the engine is operated with a high load.

When the engine is operated at a high load, the amount of fuel injected into the combustion chamber is increased. Therefore, if the shape of the combustion chamber is established such that injected fuel is collected in the spark plug pocket, a large amount of fuel flows into the spark plug pocket in a high load operation of the engine. This results in an excessively high concentration within the spark plug pocket, which causes misfiring and incomplete combustion and these, in turn, cause smoke to be generated and carbon deposits to be left on the spark plugs.

In an engine such as disclosed in JPP'155, these problems occur because the spark plug pocket which collects injected fuel is provided in the combustion chamber. However, even with a combustion chamber having no spark plug pocket, in engines performing so called a stratified combustion in which fuel is collected in the region near a spark plug to form an air-fuel mixture of an ignitable air-fuel ratio when running at low load, similar problems occur. Namely, in the engines performing a stratified combustion, the air-fuel mixture in the area surrounding the spark plug has an excessively high concentration when the amount of injected fuel increases at high engine loads. Therefore, similar problems, such as a worsening of ignition, generation of smoke and fouling of spark plugs, may occur.

If the shape of the combustion chamber is established so as to diffuse the fuel uniformly within the combustion chamber, these problems in the high load operation of the engine may be avoided. However, in this case, the air-fuel mixture becomes excessively lean in the low load operation of the engine since a small amount of fuel in the low load operation is diffused uniformly within the combustion chamber. This causes a failure to ignite air-fuel mixture.

SUMMARY OF THE INVENTION

In view of the problems in the related art set forth above, the object of the present invention is to provide a spark-ignited direct cylinder fuel injection engine which enables stable combustion over a wide range of operating conditions.

The above object is achieved by a spark-ignited direct cylinder fuel injection engine of the present invention in which the engine has a combustion chamber formed in the shape of a depression in a top surface of a piston, a direct cylinder fuel injection valve which injects a fuel mist into the combustion chamber during the compression stroke of a piston, a spark plug, and a means for causing a swirling flow of intake air in inside the combustion chamber. A configuration of a wall of the combustion chamber comprises a first region formed in an approximately arc shape along the swirling flow, a second region formed in an approximately linear shape which continues to the first region from downstream side of the swirling flow, a third region, formed in an approximately arc shape which continues to the second region from downstream side of the swirling flow. The spark plug is disposed so that its electrodes protrude into the combustion chamber at a portion near the wall in the second region when the piston is positioned near its top dead center, and the fuel injection valve has an injection port which injects fuel into the combustion chamber on the first region side of the spark plug.

According to the present invention, the fuel injection valve injects a fuel mist into the combustion chamber on the first region side from the spark plug. In this first region, the shape of the wall of the combustion chamber is approximately an arc, and the swirling flow of intake air flows along this arc-shaped surface. As a result, the injected fuel is carried by the swirling flow of air, and is diffused thereby, to form an ignitable air-fuel mixture as it flows along the wall surface. This air-fuel mixture flows along the arc-shaped wall of the combustion chamber from the first wall region toward the second region.

In addition, since the wall in the second region is nearly linear, fuel which reaches the second region does not stay in this region, but rather flows along the second region combustion chamber wall toward the third region of the combustion chamber wall.

Therefore, in the area near the second region of the combustion chamber wall surface, during the compression stroke of the piston, there is a flow of ignitable air-fuel mixture from the first region to the third region of the combustion chamber. Because the spark plug is disposed so that its electrodes protrude into the combustion chamber in the region near the wall of the second region when the piston is positioned at its top dead center, the ignitable fuel flows near the spark plug electrodes. Therefore, stable ignition of the air-fuel mixture is produced by the spark plug.

Namely, in the present invention, instead of causing the injected fuel to remain in the area near the spark plug so that an air-fuel mixture is formed, as is done in the prior art, the injected fuel passes by the spark plug while forming a ignitable air-fuel mixture as it is diffused. As a result, even when there is a large amount of injected fuel, such as in the case of engine high load operation, the injected fuel is successively carried way by the swirling air intake flow, so that it is caused to pass by the spark plug with the appropriate concentration. Therefore, the air-fuel mixture passing by the region surrounding the spark plug is maintained at an ignitable air-fuel ratio regardless of the amount of injected fuel.

BRIEF DESCRIPTION OF THE DRAWINGS

The above object and features of the present invention will be more apparent from the following description of the preferred embodiments, with reference being made to the accompanying drawings, wherein.

DESCRIPTION OF THE PREFERRED EMBODIMENT

Figure 1:
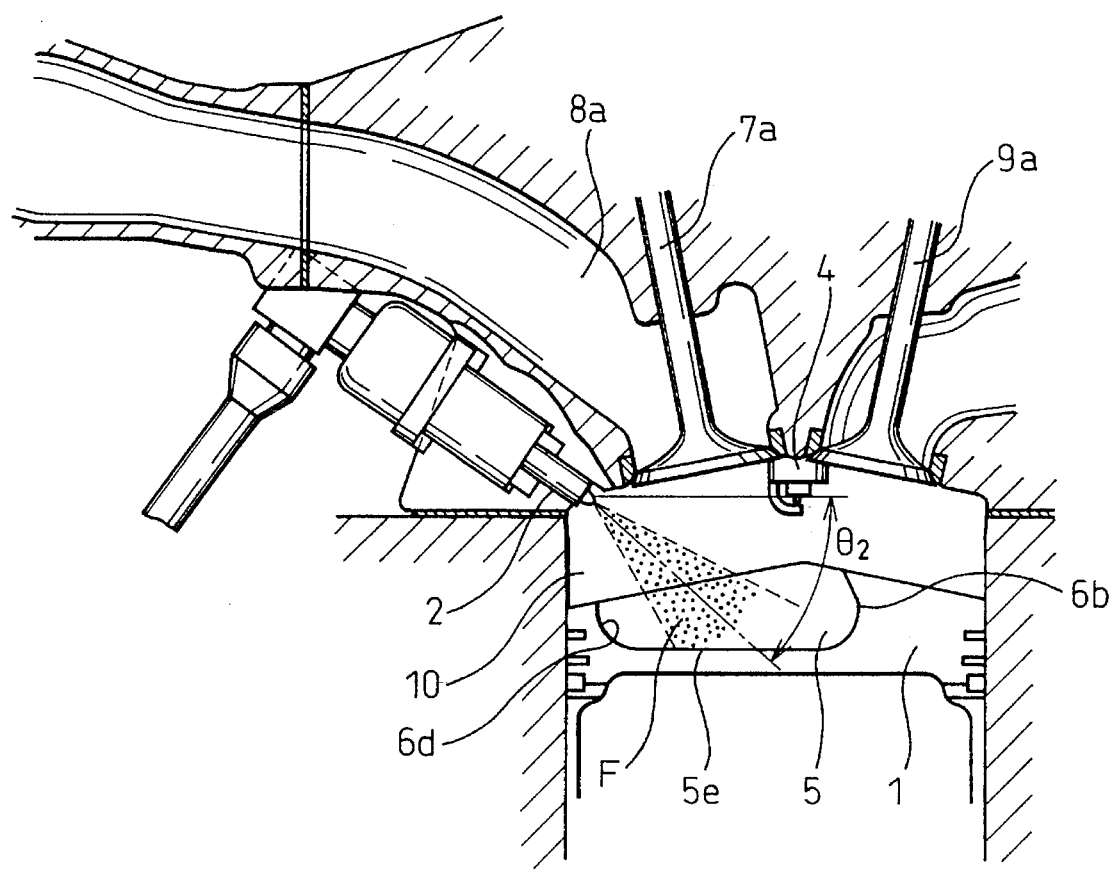
FIG. 1 is a longitudinal section view showing an embodiment of a spark-ignited direct cylinder fuel injection engine according to an embodiment of the present invention.

FIG. 1 shows a spark-ignited direct cylinder fuel injection engine to which the present invention has been applied. In this embodiment, a multi-cylinder engine is used, although FIG. 1 shows only one of the cylinders. In FIG. 1, the reference numeral 10 denotes a cylinder, 1 is a piston, and 5 is a combustion chamber formed in the upper surface of the piston 1. The configuration of the combustion chamber is explained later in detail. Numeral 2 in FIG. 1 denotes a direct cylinder fuel injection valve which directly injects fuel into the cylinder 10, and 4 denotes a spark plug.

In addition, 7a, 7b and 9a, 9b (only 7a and 9a are shown are shown in FIG. 1) indicate intake valves and exhaust valves, respectively. In this embodiment, as will be described later, each cylinder has two intake valves and two exhaust valves, this being what is known as four-valve configuration.

Figure 2:
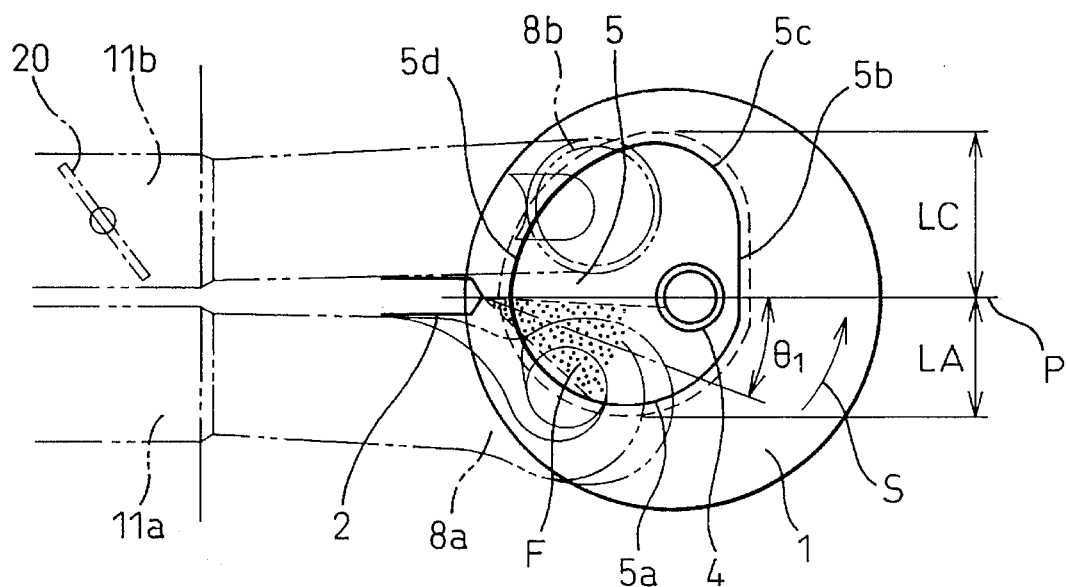
FIG. 2 is a top view of a piston showing the shape of the combustion chamber of the engine of FIG. 1.

FIG. 2 is a top view of the piston 1 in FIG. 1. As shown by imaginary line in FIG. 2, there are independent intake passages 11a and 11b connected to intake ports 8a and 8b which are provided with the intake valves 7a and 7b in this embodiment. In this embodiment, the intake port 8a gives a swirling movement to the intake air flowing into the cylinder 10. That is, the intake port 8a has a helical configuration that guides the flow of intake air in a rotational direction, thus serving as what is known as a swirl port. The intake air flowing through the swirl port 8a forms a swirl flow in the cylinder 10 in a direction perpendicular to the center axis of the cylinder.

In contrast to the intake port 8a, the intake port 8b is a straight port, which has a usual shape through which intake air flows linearly into the cylinder 10.

The intake passage 11b which is connected to the intake port 8b, i.e., the straight port, is provided with a swirl control valve (SCV) 20, which has a planar valve disc, this acting to open and close the intake passage 11b in response to the load condition on the engine.

When the SCV 20 closes the intake passage 11b, the major part of the intake air flows through the intake passage 11a, so that it flows into the cylinder 10 from the swirl port 8a. The result is that a swirling flow of intake air perpendicular to the axis of the cylinder is generated within the cylinder 10, so that at the end of the intake stroke, as the piston rises, a swirl in the direction indicated by the arrow S shown in FIG. 2 develops inside the combustion chamber 5.

In the respective embodiments explained below, fuel is injected from the direct cylinder fuel injection valve 2 when the piston is rising in the compression stroke.

As explained before, in the engine disclosed in JPP'155, the fuel injection valve has a large penetrating force, which forms a fuel jet with a narrow spray pattern, the injected fuel being caused to collide with the wall of the combustion chamber, thereby causing its atomization. In contrast to that, in this embodiment, the fuel injection valve 2 has a relatively low penetrating force, which injects a wide-angle spray of a fine mist of fuel. As shown in FIG. 2, the spark plug 4 protrudes near the approximate center part of the piston 1 in this embodiment. Further, the fuel injection valve 2 has a fuel injection port which is oriented at an angle shown as $\theta_1$ with respect to the direction of the spark plug 4, as shown in FIG. 2, thereby the fuel is injected towards upstream part of swirl flow S. In addition, as shown in FIG. 1, the orientation of fuel injection of the fuel injection valve 2 points downward at an angle of $\theta_1$ with respect to horizontal.

As will be described later, this is done to achieve reliable injection of fuel into the combustion chamber 5 over a wide range of fuel injection timing (that is, wide range of piston positions).

Next, the shape of the combustion chamber 5 in this embodiment will be explained.

As shown in FIG. 2, the combustion chamber 5 of this embodiment has, a first region 5a of the wall surface and a third region 5c of the wall surface, which are disposed so as to be mutually opposing, both these regions being in the approximate shape of an arc, along the direction of the swirl flow (that is, they each form sections of circles which are in a plane that is perpendicular to the axis of the cylinder). These two regions 5a and 5c are connected, on the side that opposes the fuel injection valve 2, by a second region 5b of the wall surface of the combustion chamber 5. The second region 5b of the wall surface is approximately the shape of a straight line. The first region 5a and the second region 5b are connected on the fuel injection valve 2 side by the wall surface 5d, which is an arc having relatively large radius. The spark plug 4 is positioned in the approximately center of the cylinder, so that its discharging electrodes protrude into the combustion chamber at a position near the second region 5b of the wall surface when the piston is positioned at top dead center.

As shown in FIG. 1, the bottom surface 5e of the combustion chamber 5 is approximately flat, this bottom surface 5e and the wall surfaces of the combustion chamber being connected by a surface depression which is such that the center of this combustion chamber, in the depth direction, has the largest cross-sectional area. As will be described later, to facilitate the passage of the air-fuel mixture near the spark plug 4, the wall surface 6b (FIG. 1) on the side of the second wall surface region 5b is made higher than the wall surface 6d on the fourth wall region surface 5d.

As shown by the arrow S in FIG. 2, the intake air swirl flows from the first wall surface area 5a inside the combustion chamber, passing along the second wall region 5b, and flows toward the third wall surface region 5c. Further, fuel is injected from the fuel injection valve 2 towards the upstream side of the swirl flow, that is, in the direction toward the first wall surface region 5a of the combustion chamber 5.

In addition, in this embodiment, the third wall surface region 5c forms an arc having a smaller radius than the first wall surface region 5a. Therefore, the distance between the third wall surface region 5c and the spark plug 4 (denoted by LC in FIG. 2) is greater than the distance from the first wall surface region 5a and the spark plug 4, (denoted by LA in FIG. 2), this making the capacity of the third wall surface region 5c, (i.e., the capacity of the part of the combustion chamber on the side of the wall surface region with respect to a straight line (denoted P in FIG. 2) passing through the spark plug 4 and perpendicular to the second wall surface region 5b) larger than the capacity of the part of the combustion chamber on the first wall surface region 5a side with respect to the straight line.

That is, in contrast to the related art, in which the shape of the combustion chamber was that of a rotating body (that is, circular in cross section), in this embodiment, the shape of the combustion chamber is asymmetrical, lacking any axis of symmetry.

Next, the ignition of the air-fuel mixture inside the combustion chamber will be explained. In this embodiment, as described above, the injection of fuel is performed during the compression stroke of the piston. When fuel is injected, a swirl flow is developed inside the combustion chamber 5 in the direction denoted by the arrow S in FIG. 2.

In this condition, when a mist of fuel having a weak penetrating force is injected from the fuel injection valve 2, the injected mist of fuel rides on this swirl and is diffused as it flows along the first wall surface region 5a. Therefore, by the time it passes by the spark plug in the region near the second wall surface region 5b, it is diffused and mixed with the intake air, and, due to the heat from the wall of the combustion chamber, part of the fuel mist is vaporized to form an ignitable air-fuel mixture. Since the ignitable air-fuel mixture passes by the region near the spark plug when the piston 1 reaches near its top dead center, it is easily ignited by the spark plug.

The air-fuel mixture which passes by the spark plug passes along the second wall surface region 5b flows into the third wall surface region 5c of the combustion chamber. However, since the capacity of the third wall surface region 5c side of the combustion chamber is larger than the capacity of the first wall surface region 5a side of the combustion chamber, even when there is a large amount of fuel injected, the injected fuel is prevented from accumulating in the area near the spark plug. Therefore, air-fuel mixture of an excessive concentration of fuel is not formed in the area near the spark plug.

Figure 3A:
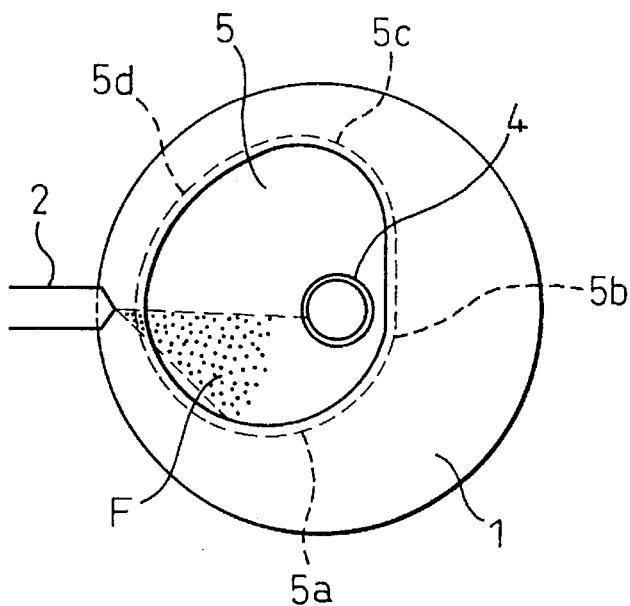
FIGS. 3A, 3B and 3C are drawings illustrating the behavior of fuel injected into the combustion chamber of the embodiment in FIG. 2.
Figure 3B:
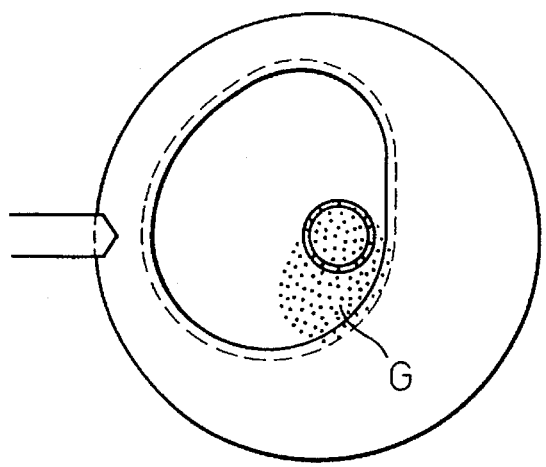
Figure 3C:
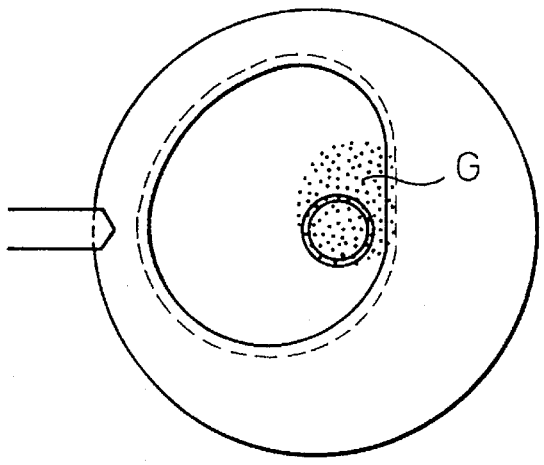
Figure 4A:
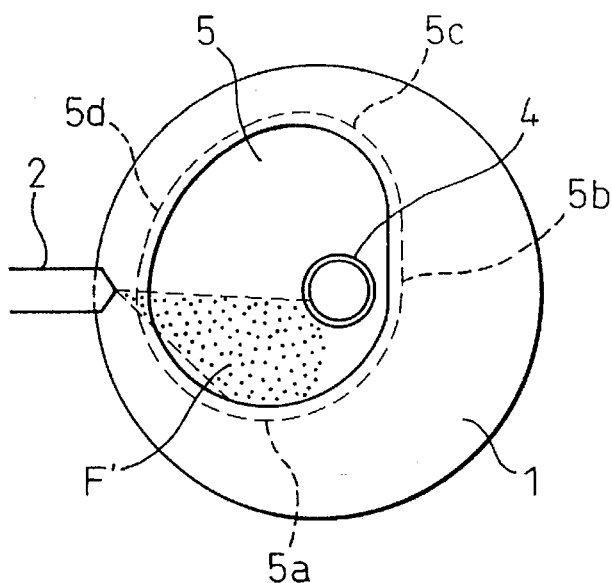
FIGS. 4A, 4B and 4C are drawings illustrating the behavior of fuel injected into the combustion chamber of the embodiment in FIG. 2, but in different condition.
Figure 4B:
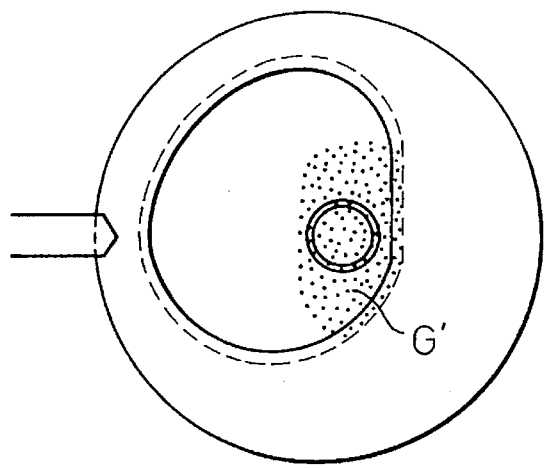
Figure 4C:
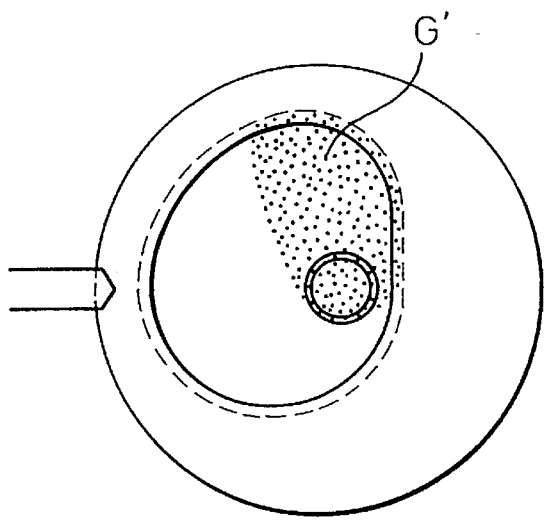

The process of the combustion of the air-fuel mixture will now be described in more detail, making reference to FIGS. 3A, 3B, 3C and FIGS. 4A, 4B, 4C. FIGS. 3A, 3B and 3C are drawings which illustrate the behavior of the injected fuel when the engine is operated under a light load with a small amount of fuel injection, while FIGS. 4A, 4B and 4C illustrate the behavior of the injected fuel when the engine is operated under a heavy load with a large amount of fuel injection.

The fuel injection valve 2 in this embodiment is controlled so that a constant amount of fuel is injected per unit time when it is opened. The amount of fuel injected is controlled by adjusting the time for which the fuel injection valve is open. Therefore, the time the fuel injection valve is opened is set to be short for a small amount of fuel injection and long for a large amount of fuel injection. In addition, in this embodiment, the period of time between injection of fuel and ignition is controlled so as to remain constant, regardless of the either the amount of injected fuel or the speed of the engine. That is, in this embodiment, when the amount of fuel to be injected is small, fuel injection is started at a relatively late stage in the compression stroke, and when the amount of fuel to be injected is large, fuel injection is started at relatively early stage in the compression stroke.

FIGS. 3A, 3B, 3C show the case in which a small amount of fuel injected. In this case, the fuel is injected into the first wall surface region 5a of the combustion chamber 5 at a relatively late stage in the compression stroke, as shown in FIG. 3A. This fuel forms a relatively small cloud of fuel mist indicated by F in FIG. 3A. This cloud of fuel mist is carried by the swirl and flows along the arc-shaped first wall surface region 5a. During the time the cloud of the fuel mist flowing along the first wall surface region 5a, the fuel particles are diffused and vaporized, to form the ignitable air-fuel mixture G (FIG. 3B), which reaches the second wall surface region 5b. Because the second wall surface region 5b is shaped as an approximate straight line, the ignitable air-fuel mixture G passes quickly along the second wall surface region to pass by the spark plug 4 and, after passing by the spark plug 4, it flows into the third wall surface region 5c. Because the timing of the spark from the spark plug 4 is set so that the spark occurs as the air-fuel mixture G is in the process of passing by the position of the spark plug 4, as shown in FIG. 3C, the ignitable air-fuel mixture G is ignited as it passes by the area near the spark plug 4, thus a flame propagates throughout the entire air-fuel mixture layer.

When the fine mist is injected from the fuel injection valve, as in this embodiment, since the injected fuel is easily diffused, the air-fuel mixture tends to be excessively lean when the amount of fuel is relatively small. In this embodiment, by establishing the capacity of the first wall surface region of the combustion chamber so as to be relatively small, the distance between the first wall surface region and the spark plug is made small (denoted by LA in FIG. 2), so that the injected fuel flows relatively easily toward the spark plug without being excessively diffused. For this reason, even in cases in which the amount of fuel injected is small, an appropriate concentration of the fuel in the air-fuel mixture is maintained. Therefore, a stable ignition of the air-fuel mixture by the spark plug 4 can be achieved.

FIGS. 4A, 4B, 4C illustrate the case of a relatively large amount of injected fuel. In this case the fuel is injected at a relatively early stage in the compression stroke, as shown in FIG. 4A. Compared to the case illustrated in FIG. 3A, this fuel forms a relatively large cloud of fuel mist F. As shown in FIG. 4B, this fuel diffuses and is vaporized to form the ignitable air-fuel mixture layer G' in the same manner as shown in FIG. 3B, and flows along the second wall surface region 5b, passing by the spark plug 4. Then, as shown in FIG. 4C, this fuel is ignited by the spark plug 4 at approximately the same time as in the case illustrated in FIG. 3C.

In this embodiment, because the time from the injection of fuel to the ignition is maintained approximately constant regardless of the amount of fuel injected, the injection of fuel is started relatively early in FIG. 4A. Therefore, as shown in FIG. 4C, a relatively large amount of fuel passes by the spark plug and flows into the third wall surface region 5c of the combustion chamber 5 before the air-fuel mixture is ignited by the spark plug. In this embodiment, however, because the capacity of the third wall surface region 5c of the combustion chamber 5 is larger than the capacity of the first wall surface region 5a, the fuel which has flowed into the third wall surface region 5c of the combustion chamber 5 does not accumulate in the area near the spark plug. Therefore, even when a large amount of fuel is injected, the air-fuel mixture in the area near the spark plug does not have an excessively high concentration.

More specifically, in this embodiment, rather than causing fuel to accumulate in the area surrounding the spark plug to form an ignitable air-fuel mixture, an air-fuel mixture having a air-fuel ratio in the ignitable range is caused to pass by the area near the spark plug, thereby facilitate good ignition of the air-fuel mixture, regardless of the amount of fuel injected.

Next, an embodiment of the present invention which is different than the embodiment described above will be explained. FIGS. 5A, 5B, 5C and FIGS. 6A, 6B, 6C illustrate the behavior of injected fuel inside the combustion chamber in this embodiment, these drawings corresponds to FIGS. 3, respectively.

As shown in FIGS. 5A, 5B, 5C and FIGS. 6A, 6B, 6C, the shape of the combustion chamber in this embodiment is also an asymmetrical configuration which has approximately arc-shaped first and third wall surface regions and an approximately straight second wall surface region, as is the embodiment shown in FIGS. 3A, 3B, 3C and FIGS. 4A, 4B, 4C. However, in the case of this embodiment, the first wall surface region 5a is shaped with an arc having a smaller radius than the arc of the third wall surface region 5c, which is the reverse of the relationship of these two regions in the previously described embodiment. As a result, the capacity of the first wall surface region 5a of the combustion chamber is larger than that of the third wall surface region 5a.

In other respects, such as the positions of the fuel injection valve 2 and the spark plug 4, the direction of the swirl, and the cross-sectional shape of the combustion chamber along the axial direction of the cylinder, this embodiment is similar to the embodiment described above and illustrated in FIGS. 1 to 4A, 4B and 4C.

As noted above, in contrast to the previously described embodiment, in this embodiment the first wall surface region of the combustion chamber 5a is larger, this having the effect described below.

In the first described embodiment, which was illustrated with FIGS. 1 to 4A, 4B and 4C, fuel which is injected into the first wall surface region 5a of the combustion chamber is caused to ride on the swirl and is caused to flow into the third wall surface region 5c of the combustion chamber actively, thereby preventing the accumulation of fuel in the area near the spark plug 4. However, by doing this, the time required for the fuel to reach the area near the spark plug 4 is relatively short, and the fuel flows easily toward the spark plug. Therefore, for example, when the engine is operated under a high load, there is a possibility that the injected fuel will reach the spark plug 4 before it can be sufficiently diffused. Although, as shown in FIG. 3C, the spark timing of the spark plug can be delayed to ensure sufficient fuel diffusion so that the spark plug fires just before the air-fuel mixture completely passes the spark plug, since the timing for firing is limited within the period in which the air-fuel mixture passes by the spark plug, it is difficult to ensure the sufficient time for the fuel diffusion even if the spark timing is delayed.

In this embodiment, in reverse of the arrangement in the previously described embodiment, by making the combustion chamber capacity of the first wall surface region 5a large, the fuel injected in the first wall surface region 5a of the combustion chamber is sufficiently diffused before flowing to the second wall surface region 5b, and forms the ignitable air-fuel mixture.

Figure 5A:
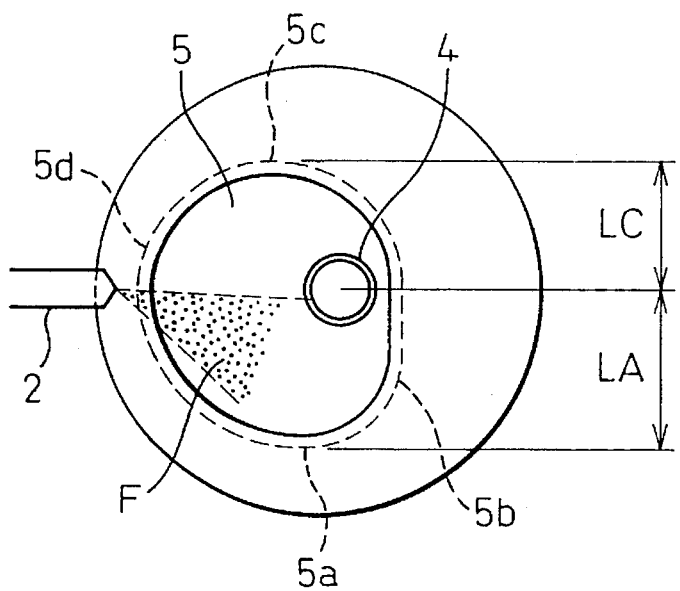
FIGS. 5A, 5B and 5C are drawings similar to FIGS. 3A, 3B and 3C, showing the shape of the combustion chamber and the behavior of fuel injected therein, but for a different embodiment of the present invention.

That is, in this embodiment, although the fuel F which is injected into the first wall surface region combustion chamber part rides on the swirl and is carried toward the second wall surface region, because the capacity of the first wall surface region combustion chamber part is large (that is, the distance LA is greater than the distance LC as shown in FIG. 5A), it is possible to achieve sufficient fuel diffusion when the engine is run at high speed or at a high load, thereby facilitating ignition of the fuel by the spark plug.

Figure 5B:
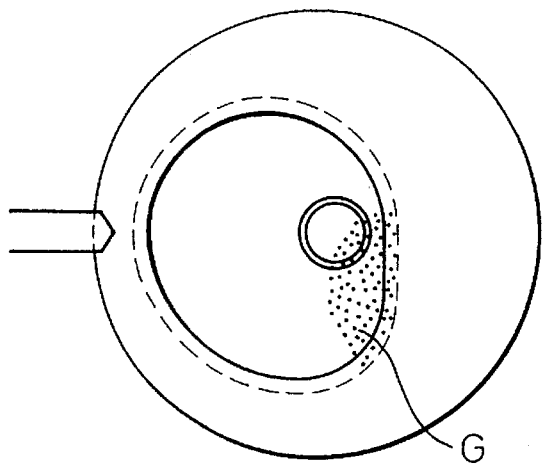
Figure 5C:
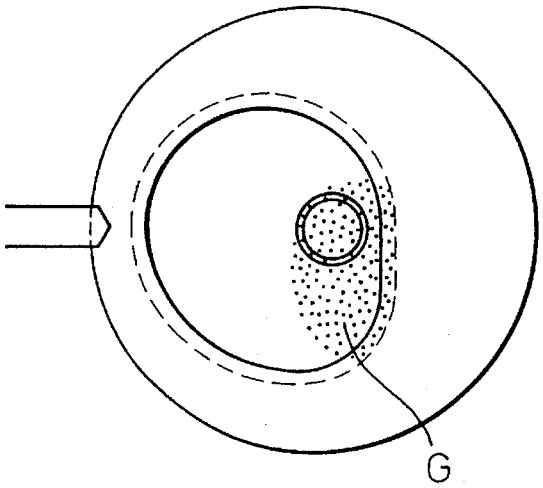

FIGS. 5A through 5C show the behavior of the injected fuel in this embodiment when a small amount of fuel is injected. FIG. 5A through 5C show, respectively, the conditions of the fuel which were illustrated for the previously described embodiment in FIGS. 3A through 3C. As seen from FIG. 5C, the injected fuel reaches the spark plug in a sufficiently diffused condition (shown by G in FIG. 5C), when compared with the case illustrated in FIG. 3C.

Figure 6A:
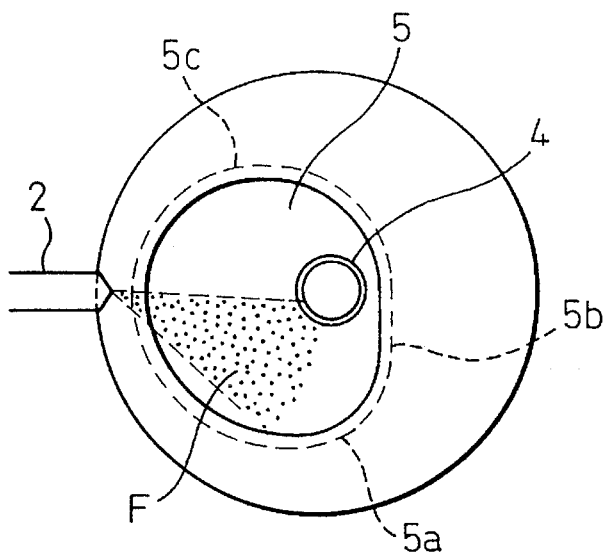
FIGS. 6A, 6B and 6C are drawings similar to FIGS. 3A, 3B and 3C, showing the shape of the combustion chamber and the behavior of fuel injected therein, but for a different embodiment of the present invention.
Figure 6B:
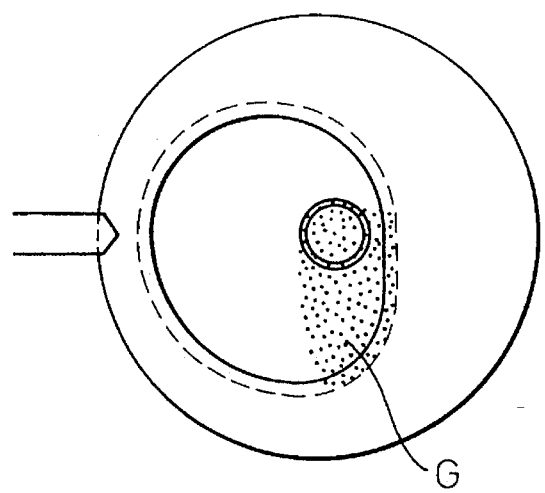
Figure 6C:
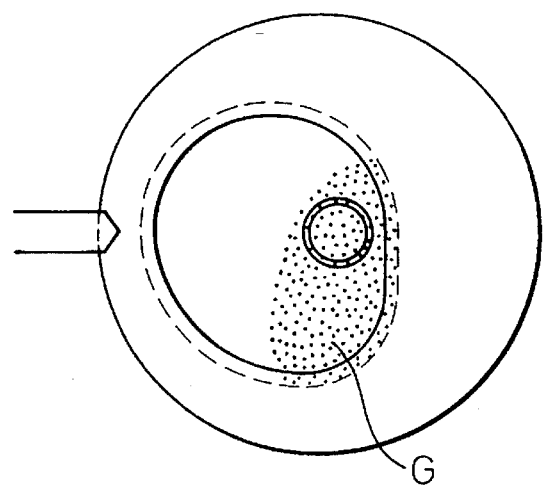

FIGS. 6A through 6C show the behavior of the injected fuel, in this embodiment, when a large amount of fuel is injected. FIGS. 6A through 6C correspond to FIGS. 4A through 4C. As can be seen from FIGS. 6A through 6C, by making the first wall surface region combustion chamber part large, even when a large amount of fuel is injected, the injected fuel is sufficiently diffused within the first wall surface region combustion chamber part, so that it does not accumulate in the area near the spark plug, thereby preventing the formation of an air-fuel mixture having an excessively high concentration in the area near the spark plug.

Next, the shape of the combustion chamber of another embodiment of the present invention will be described, with reference to FIG. 7.

Figure 7:
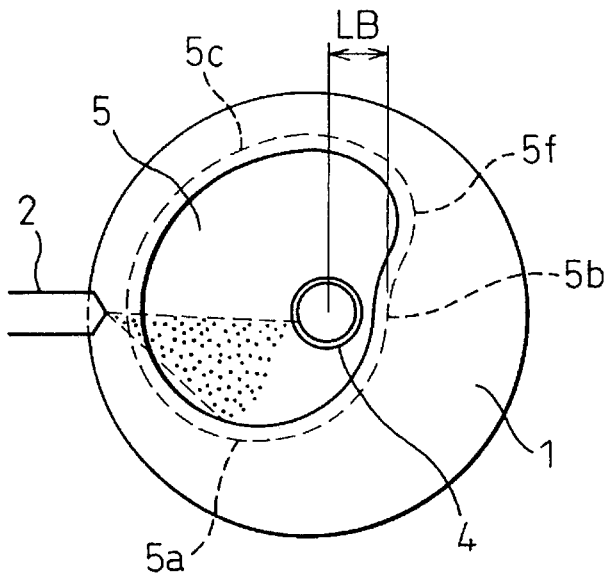
FIG. 7 is a drawing showing the shape of the combustion chamber for a different embodiment of the present invention.

In the embodiment shown in FIG. 7, the shape of the combustion chamber is approximately the same as in the embodiment illustrated in FIGS. 1 through 4A, 4B and 4C, with the capacity of the third wall surface region 5c combustion chamber part being made larger than the capacity of the first wall surface region 5a combustion chamber part. Further, in the embodiment shown in FIG. 7, there is a pocket 5f which is formed in the area near the part of the wall connecting the second wall surface region 5b and the third wall surface region 5c, and capacity of the third wall surface region 5c is larger than in the embodiment shown in FIGS. 1 through 4A, 4B and 4C.

As previously described, in the embodiment shown in FIGS. 1 through 4A, 4B and 4C, by making the capacity of the third wall surface region of the combustion chamber larger than the capacity of the first wall surface region of the combustion chamber, fuel which is injected into the first wall surface region of the combustion chamber actively flows toward the third wall surface region of the combustion chamber.

Also, by establishing a large capacity for the third wall surface region of the combustion chamber, the accumulation of the fuel in the area near the spark plug is prevented even when the amount of the fuel injected in the combustion chamber is large. Therefore, the capacity of the third wall surface region combustion chamber part must be large enough to hold this fuel so that the fuel is not permitted to accumulate in the area near the spark plug, even when a large amount of fuel is injected.

For this reason, the capacity of the third wall surface region part of the combustion chamber must be made large enough to accommodate the maximum amount of injected fuel. Further, in the case of stratified-charge combustion (that is, combustion in which strata of ignitable air-fuel mixture is formed in an overall lean air-fuel mixture to enable combustion with an overall lean air-fuel ratio, as shown in FIGS. 3A through 3C and 4A though 4C) which is performed up to the high-load region as shown in FIG. 3 and FIG. 4, it is necessary to make the capacity of the third wall surface region of the combustion chamber large, in response to the increase in the amount of fuel that is injected.

However, because the longitudinal dimension of the combustion chamber (the distance between the first wall surface region and the third wall surface region) is limited, to increase the capacity of the third wall surface region part of the combustion chamber beyond a certain limit, it becomes necessary to increase the lateral dimension of the combustion chamber (the distance between the second wall surface region and the fourth wall surface region).

In general, because the spark plug is positioned in the center of the cylinder, when the lateral dimension of the combustion chamber is increased, the distance between the spark plug and the second wall surface region of the combustion chamber increases. In the embodiment shown in FIG. 2, because the air-fuel mixture flows along the second wall surface region as described before, if the distance between the spark plug and the wall surface increases, a problem arises in that it becomes difficult for the spark plug to ignite the air-fuel mixture.

In the embodiment shown in FIG. 7, the above problem is solved by providing a depressed pocket 5f on the wall surface of the combustion chamber. That is, by providing the depressed pocket 5f, a great increase can be achieved in the capacity of the third wall surface region, without increasing the distance between the spark plug and the second wall surface region of the combustion chamber (denoted LB in FIG. 7), making it possible to perform stable stratified-charge combustion even when a large amount of fuel is injected.

Further, although in FIG. 7, the pocket 5f is shown as being provided in the section which makes the connection between the second wall surface region 5b and the third wall surface region 5c, since this pocket 5f is provided for the purpose of increasing the capacity of the third wall surface region combustion chamber part, it is possible to provide it on a part other than that shown in FIG. 7 as long as it is on a part that is on the third wall surface region side of the spark plug.

Next, another embodiment of the present invention will be described, with reference to FIGS. 8 and 9.

Figure 8:
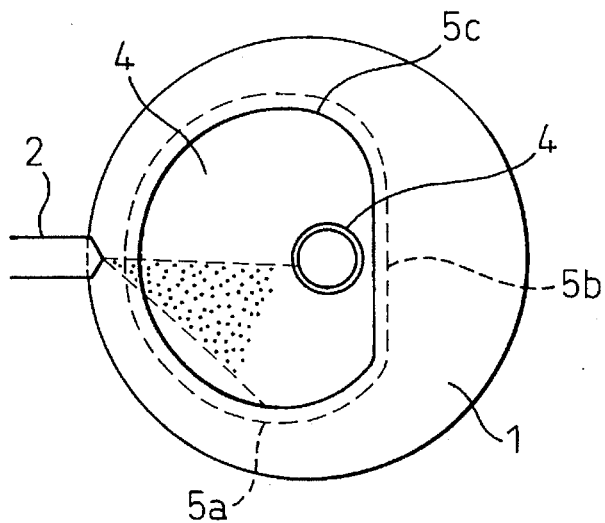
FIG. 8 is a drawing showing the shape of the combustion chamber for a different embodiment of the present invention.

The embodiment shown in FIG. 8 differs from each of the above-described embodiments, in that the shape of the combustion chamber is such that the capacities of the first wall surface region combustion chamber part and the third wall surface region combustion chamber part are equal, the combustion chamber being approximately symmetrical.

When performing stratified-charge combustion, it is necessary to prevent the diffusion of the injected fuel over the entire volume of combustion chamber. Also, it is required to cause the formation of an air-fuel mixture having an air-fuel ratio in the ignitable range in the area near the spark plug with the proper timing. Further, this ignitable air-fuel mixture must be formed when the amount of injected fuel is small, as well as when a large amount of fuel is injected. However, it is extremely difficult to achieve both of these goals simultaneously, and for that reason, in the embodiment shown in FIGS. 1 through 4A, 4B and 4C, the capacity of the third wall surface region combustion chamber part is made larger than the capacity of the first wall surface region combustion chamber part. This configuration of the combustion chamber is such that the prevention of diffusion of fuel when the amount of the fuel is small is given somewhat more weight. In contrast to this, in the embodiment shown in FIGS. 5A through 5C and 6A through 6C, by making the capacity of the first wall surface region combustion chamber part larger, the configuration of the combustion chamber is such that slightly more weight is given to actively causing the diffusion of fuel.

In contrast to the above embodiments, the shape of the combustion chamber in FIG. 8, can be thought of as being midway between that in the embodiment shown in FIGS. 1 to 4A, 4B and 4C and the embodiment shown in FIGS. 5A through 5C and 6A through 6C. Namely in this embodiment, the capacities of the first and the third wall surface regions of the combustion chamber are set up to be equal, thereby enabling both the prevention of fuel diffusion when a small amount of fuel is injected, and the prevention of the formation of an air-fuel mixture having an excessive concentration when a large amount of fuel is injected, to a certain degree.

Figure 9:
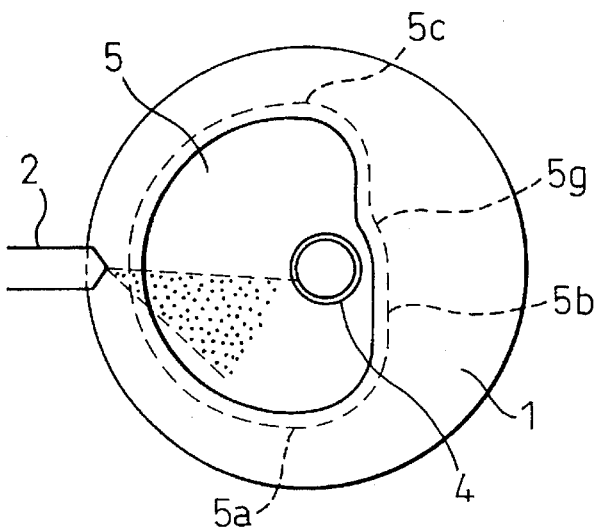
FIG. 9 is a drawing showing the shape of the combustion chamber for a different embodiment of the present invention.

In addition, FIG. 9 shows a variation of the shape of the combustion chamber shown in FIG. 8. In this embodiment, the part 5g of the second wall surface region 5b of the combustion chamber, which is positioned downstream side of the swirl flow with respect to the spark plug 4, is formed as an arc formed about the spark plug 4, so that a constant distance is maintained between the spark plug 4 and the surface of the wall. If the shape of the combustion chamber is made such as shown in FIG. 8, with a straight second wall surface region 5b downstream of the spark plug, there is a limitation in the timing at which ignition of the air-fuel mixture is possible, particularly in the case in which the amount of injected fuel is small. This is, because the distance between the spark plug and the second wall surface region 5a increases in the downstream direction. In contrast to this, by forming an arc-shaped part 5g in the second wall surface region 5b, as described above, the timing range over which ignition is possible broadens, thereby facilitating ignition by means of the spark plug even in the case, for example, when the amount of injected fuel is small, because in this range the distance between the spark plug and the surface of the wall is held constant.

It is possible, according to the present invention as noted in any of the claims set forth herein, in performing direct cylinder fuel injection, to achieve good ignition of the air-fuel mixture over a wide range of operating conditions.

We claim:

1. A direct cylinder fuel injection type spark-ignited engine having a combustion chamber formed in the shape of a depression in a top surface of a piston, a direct cylinder fuel injection valve which injects a fuel mist into said combustion chamber during the compression stroke of a piston, a spark plug, and a means for causing a swirling flow of intake air in inside the combustion chamber, a configuration of a wall of said combustion chamber, comprising:

a first region formed in an approximately arc shape along said swirling flow;

a second region formed in an approximately linear shape which continues to said first region from the downstream side of said swirling flow; and a third region, formed in an approximately arc shape which continues to said second region from downstream side of said swirling flow, said spark plug being disposed so that its electrodes protrude into said combustion chamber at a portion near the wall in said second region when the piston is positioned near its top dead center, and said fuel injection valve having an injection port which injects fuel into said combustion chamber on said first region side of the spark plug.

2. A direct cylinder fuel injection type spark-ignited engine according to claim 1, wherein the capacity of a part of said combustion chamber on the side of said third region from said spark plug is made larger than the capacity of the part of said combustion chamber on the side of said first region.

3. A direct cylinder fuel injection type spark-ignited engine according to claim 1, wherein the capacity of a part of said combustion chamber on the side of said first region from said spark plug is made larger than the capacity of the part of said combustion chamber on the side of said third region.

4. A direct cylinder fuel injection type spark-ignited engine according to claim 2, wherein a depressed pocket is provided in one of the combustion chamber wall surfaces in the part of the second region on the downstream side of the swirling flow direction from said spark plug, and in the wall surface of said third region of the combustion chamber.

* * * * *

UNITED STATES PATENT AND TRADEMARK OFFICE
CERTIFICATE OF CORRECTION

PATENT NO. : 5,553,588
DATED : September 10, 1996
INVENTOR(S) : Takeshi GONO, et al.

It is certified that error appears in the above-indentified patent and that said Letters Patent is hereby corrected as shown below:

Column 1, line 23, insert --the-- before "wall".

Column 1, line 32, insert --the-- before "surface".

Column 1, line 39, change "a" to --an--.

Column 2, line 12, change "so called a" to --a so-called·

Column 2, line 29, insert --the-- before "air-fuel".

Column 2, line 46, delete "in".

Column 3, line 22, change "a" to --an--.

Column 3, line 26, change "way" to --away--.

Column 5, line 8, delete the comma after "has".

Column 5, line 21, change "approximately" to --approximate--.

Column 5, line 51, delete the comma after "plug 4".

Column 5, line 53, delete the comma after "5c".

Column 6, line 17, insert --and-- before "flows".

Column 6, line 46, delete "the" before "either".

UNITED STATES PATENT AND TRADEMARK OFFICE
CERTIFICATE OF CORRECTION

PATENT NO. : 5,553,588
DATED : September 10, 1996
INVENTOR(S) : Takeshi GONO, et al.

It is certified that error appears in the above-indentified patent and that said Letters Patent is hereby corrected as shown below:

Column 6, line 51, insert --a-- before "relatively".

Column 6, line 53, insert --is-- after "fuel" and change "the, first" to --the first--.

Column 6, line 59, insert --is-- after "mist".

Column 7, line 5, change "4," to --4;--.

Column 7, line 51, change "a" to --an--.

Column 7, line 52, change "facilitate" to --facilitating--.

Column 7, line 60, change "embodiment," to --embodiment;-- and "corresponds" to --correspond--.

Column 7, line 61, after "FIGS. 3," insert --3A, 3B, 3C and FIGS. 4A, 4B, 4C--.

Column 7, line 66, change "is" to --in--.

Column 8, line 56, change "FIG." to --FIGS.--.

UNITED STATES PATENT AND TRADEMARK OFFICE
CERTIFICATE OF CORRECTION

PATENT NO. : 5,553,588
DATED : September 10, 1996
INVENTOR(S) : Takeshi GONO, et al.

It is certified that error appears in the above-indentified patent and that said Letters Patent is hereby corrected as shown below:

Column 9, line 46, change "though" to --through--.

Column 10, line 54, delete the comma after "8".

Column 11, line 9, change "This is," to --This is--.

Column 11, line 30, delete "in".

Signed and Sealed this

Twentieth Day of May, 1997

*Attest:*

BRUCE LEHMAN

*Attesting Officer*  *Commissioner of Patents and Trademarks*